United States Patent
Ramachandran et al.

(10) Patent No.: US 8,411,599 B2
(45) Date of Patent: Apr. 2, 2013

(54) METHODS AND APPARATUS FOR TIMESLOT TELECONFERENCING

(75) Inventors: Jayaraman Ramachandran, Plainsboro, NJ (US); Neerav Mehta, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 676 days.

(21) Appl. No.: 12/638,517

(22) Filed: Dec. 15, 2009

(65) Prior Publication Data

US 2011/0141951 A1 Jun. 16, 2011

(51) Int. Cl.
*H04L 12/16* (2006.01)
*H04Q 11/00* (2006.01)

(52) U.S. Cl. ........................................ 370/263; 370/260

(58) Field of Classification Search .................. None
See application file for complete search history.

(56) References Cited

U.S. PATENT DOCUMENTS

| | | | |
|---|---|---|---|
| 5,631,904 A | 5/1997 | Fitser et al. | |
| 6,839,417 B2 | 1/2005 | Weisman et al. | |
| 8,175,243 B2 * | 5/2012 | Mahalingam | 379/202.01 |
| 2004/0047461 A1 * | 3/2004 | Weisman et al. | 379/202.01 |
| 2005/0180342 A1 * | 8/2005 | Summers et al. | 370/261 |
| 2006/0062367 A1 * | 3/2006 | Christenson et al. | 379/202.01 |
| 2007/0126862 A1 * | 6/2007 | Even et al. | 348/14.08 |
| 2008/0096588 A1 * | 4/2008 | Waytena et al. | 455/466 |
| 2008/0253546 A1 * | 10/2008 | Chen et al. | 379/202.01 |
| 2009/0086951 A1 * | 4/2009 | Geppert et al. | 379/204.01 |
| 2010/0165887 A1 * | 7/2010 | Ristock et al. | 370/260 |

* cited by examiner

*Primary Examiner* — Phirin Sam
(74) *Attorney, Agent, or Firm* — Cantor Colburn LLP

(57) ABSTRACT

Methods and apparatus are provided for a timeslot teleconference. A meeting invite is created for a timeslot teleconference on a computer. Timeslots are created for the timeslot teleconference in the meeting invite on the computer. Participants are designated for the timeslots in the meeting invite on the computer, and the timeslots are different time periods during the timeslot teleconference, which can have variable start and end times, as determined by a host. Reach numbers are added for each of the participants in the meeting invite on the computer, and the reach numbers are contact numbers to call the participants for their respective timeslots. The meeting invite is transmitted to participants on the computer. To participate in the timeslot teleconference, the timeslot teleconference is configured for the reach numbers to be called for the participants to correspond to their respective timeslots and/or the participants to call in for their respective timeslots.

14 Claims, 8 Drawing Sheets

| Appointment | Scheduling | | Groups | Timeslots |
|---|---|---|---|---|
| Name | Timeslot 1 | Timeslot 2 | Timeslot 3 | Timeslot 4 |
| Group 1 | | | | |
| Group 2 | Y | Y | | Y |
| Group 3 | | Y | | |
| Alice | Y | (Y) | | (Y) |
| Bob | Y | (Y) | Y | |
| Chuck | Y | (Y) | Y | (Y) |
| Denise | | (Y) | | |
| Edgar | Y | (Y) | | (Y) |

230

202 — Appointment
204 — Scheduling
206 — Groups
208 — Timeslots

FIG. 5

400 Continued

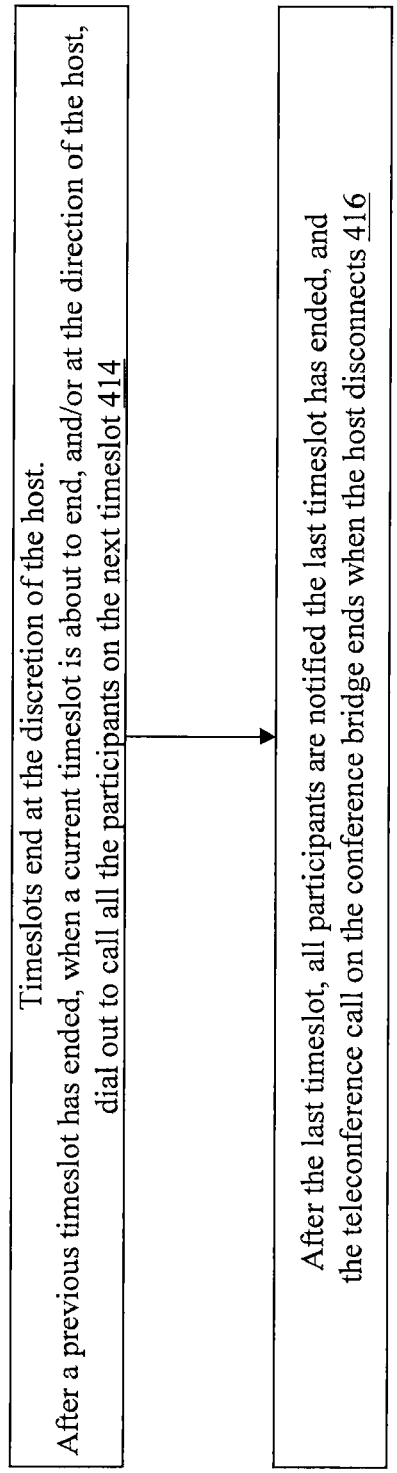

Timeslots end at the discretion of the host. After a previous timeslot has ended, when a current timeslot is about to end, and/or at the direction of the host, dial out to call all the participants on the next timeslot 414

After the last timeslot, all participants are notified the last timeslot has ended, and the teleconference call on the conference bridge ends when the host disconnects 416

METHODS AND APPARATUS FOR TIMESLOT TELECONFERENCING

BACKGROUND

Exemplary embodiments relate to teleconferencing, and more particularly to, timeslot teleconferencing.

There are several arrangements known in the art for establishing a conference call between three or more parties. One method for establishing a conference call involves having a person call each party to the conference and individually bridge each called party onto the conference call. A second technique for establishing a conference call involves providing a "dial-in" telephone number, which is accessed through the use of an access code, to join all parties at a common bridge. This technique provides significantly improved performance and auditory quality for conference calls involving a large number of participants. Also, each participant dials in to the bridge, eliminating the need for the host to dial each participant individually. This technique requires that the conference call be prearranged so that a dial-in number and access code can be assigned for the call and each participant must know of the call beforehand to be able to participate.

BRIEF SUMMARY

Exemplary embodiments include a method implemented on a computer for a timeslot teleconference. A meeting invite is created for a timeslot teleconference on a computer. Timeslots are created for the timeslot teleconference in the meeting invite on the computer. Participants are designated for the timeslots in the meeting invite on the computer, and the timeslots are different time periods during the timeslot teleconference, can have variable start and end times, as determined by a host. Reach numbers are added for each of the participants in the meeting invite on the computer, and the reach numbers are contact numbers to call the participants for their respective timeslots. The meeting invite is transmitted to the participants on the computer. To participate in the timeslot teleconference, the timeslot teleconference is configured for the reach numbers to be called for the participants to correspond to their respective timeslots and/or the participants to call in for their respective timeslots.

Exemplary embodiments include a method implemented on a computer for a timeslot teleconference. A timeslot teleconference is created including a first timeslot, a second timeslot, through an Nth timeslot on a computer, and the Nth timeslot is the last of all the created timeslots. The first timeslot is corresponded to a first time period during the timeslot teleconference, the second timeslot is corresponded to a second time period during the timeslot teleconference, and the Nth timeslot is corresponded to an Nth time period during the timeslot teleconference on the computer. The timeslot teleconference is configured to allow participants designated to the first timeslot to participate in the timeslot teleconference during the first time period. The timeslot teleconference is configured to allow participants designated to the second timeslot to participate in the timeslot teleconference during the second time period. The timeslot teleconference is configured to allow participants designated to the Nth timeslot to participate in the timeslot teleconference during the Nth time period.

Other systems, methods, apparatus, devices, and/or computer program products according to embodiments will be or become apparent to one with skill in the art upon review of the following drawings and detailed description. It is intended that all such additional systems, methods, apparatus, devices, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3 illustrates an example of a view in accordance with exemplary embodiments;

FIGS. 4 and 5 illustrate a flow in accordance with exemplary embodiments;

Figure 1:
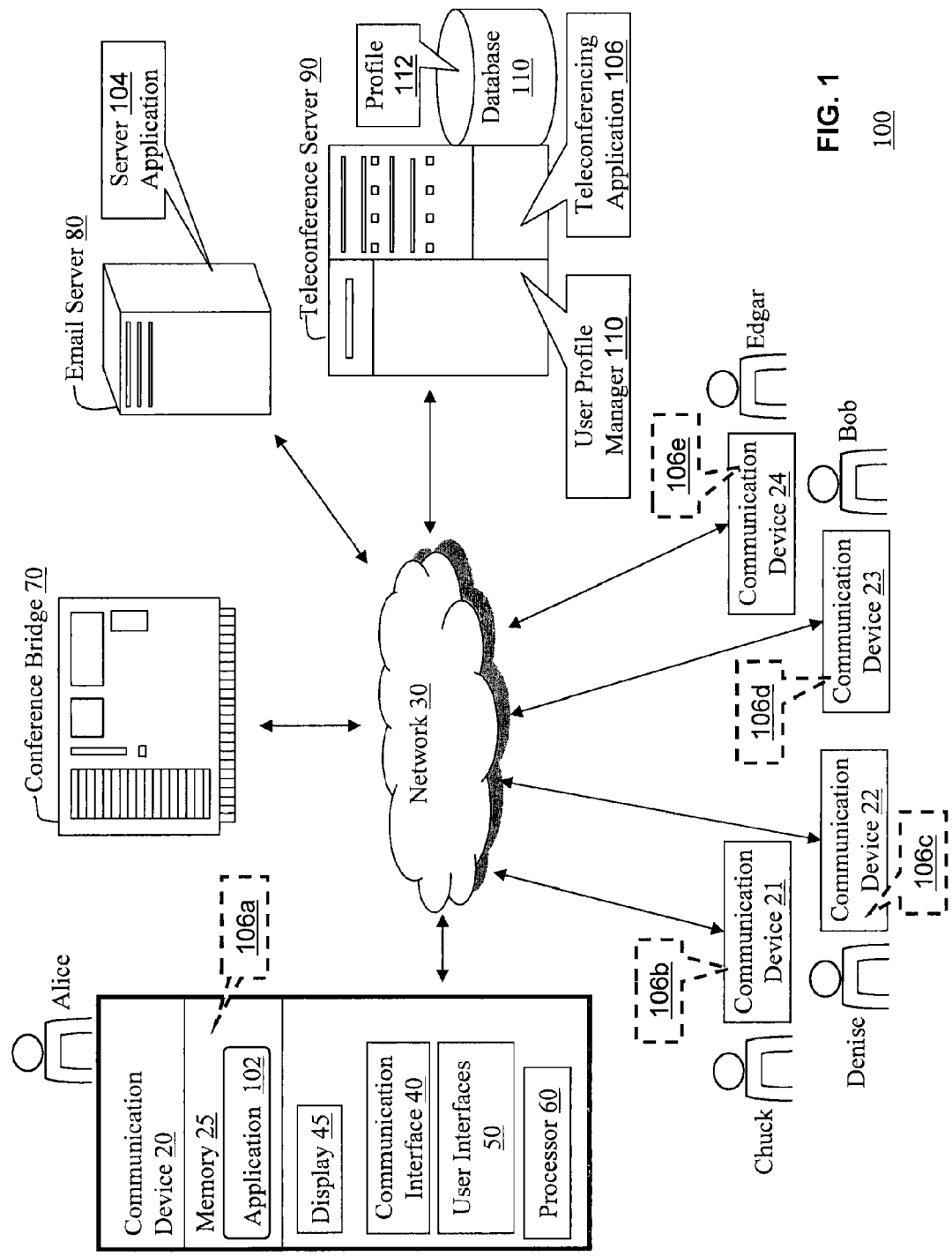
FIG. 1 illustrates a block diagram in accordance with exemplary embodiments.

The detailed description explains exemplary embodiments, together with features, by way of example with reference to the drawings.

DETAILED DESCRIPTION OF EXEMPLARY EMBODIMENTS

In the following detailed description, numerous specific details are set forth in order to provide a thorough understanding of exemplary embodiments. However, it will be understood by those skilled in the art that the present disclosure may be practiced without these specific details. In other instances, well-known methods, procedures, components, and circuits have not been described in detail so as not to obscure the present disclosure.

Exemplary embodiments provide advanced features for timeslot teleconference calls via a new software application working with existing email servers and phone networks. A timeslot teleconference call is a specific type of virtual telecommunications voice service used, e.g., in corporate settings to bring together a large group of people, all of whom do not need to be present on the call from start to finish. The meeting organizer, which will be referred to as the host, has a series of timeslots arranged according to a predefined agenda with different (and sometimes the same) attendees for each segment.

In accordance with exemplary embodiments, characteristics of timeslot teleconference calls include: participants do not all need to be on the call at once; aside from the host (and maybe a small core of essential attendees), most people join the call when needed and drop immediately afterwards; participants are grouped by some common property and may need to be added and dropped individually and/or as a group.

In accordance with exemplary embodiments, conversation (e.g., of an agenda) drives timeslots. The host creates the agenda, and each agenda item requires a list of participants (which are added by the host) and a timeslot when the participants will work on and discuss their corresponding item. In exemplary embodiments, the timeslots are ordered but are not required to start at fixed times because of the ebb and flow of the conversation. Further characteristics of exemplary embodiments include participants may be pulled into the teleconference call individually and/or in groups, and the host may drop anyone that the host desires once an agenda item and/or timeslot is complete.

Exemplary embodiments provide a mechanism that will enable the seamless creation and management of a timeslot teleconference meeting. Unlike exemplary embodiments, conventional calendar and conferencing solutions fail to offer support for conducting timeslot teleconference calls. For example, conventional teleconferencing solutions address this issue in a manual or ad hoc manner, and participants join at the beginning of the call and wait for their turn to arrive. This is unproductive and leads to multi-tasking and other inefficiencies during a normal conference call. Exemplary embodiments, however, are configured to relieve some of the overloading of corporate calendars experienced by users today by allowing a more selective use of participant's time.

As an example scenario utilizing timeslot teleconferencing of exemplary embodiments, there may be a corporate business program review where a package of business case proposals are cycled through one by one. Upper management quizzes separate project teams on objectives, business value, time lines, etc. Using exemplary embodiments as discussed herein, each project team can be assigned a specific group (and/or individual) timeslot which reduces the waiting time of the various project teams, because each separate project team is not required on the teleconference call until their respective timeslot is started and/or about to start. As the host's discretion, the timeslot teleconference may end without advancing through each timeslot in accordance with exemplary embodiments.

Now turning to the figures, FIG. 1 illustrates a block diagram 100 in accordance with exemplary embodiments.

FIG. 1 illustrates a communication device 20 having memory 25, which includes a computer readable storage medium. The communication device 20 may include one or more applications 102 and 106a that are configured with computer executable instructions to implement exemplary embodiments discussed herein. The applications 102 and 106a may include and/or represent numerous software components for carrying out the operations and functions of exemplary embodiments.

The communication device 20 may include a communication interface 40, such as the software and hardware understood by one skilled in the art, for communicating over a network 30. The communication device 20 may include a display 45, user interfaces 50, and processors 60. The user interfaces 50 may include, e.g., a mouse, track ball, pointing devices, keyboard, etc., for inputting commands and operating the communication device 20.

Similarly, communication devices 21-24 may also include the communication interface 40, display 45, user interfaces 50, processors 60, and a similar memory 25 although not shown for conciseness. The communication devices 20-24 are configured to operatively connect to the network 30.

The communication devices 20-24 may include, for example and without limitation, mobile telephones, smart telephones, soft telephones, personal digital assistants, set top boxes (STB), televisions (TV), game consoles, MP3 players, computers, computing devices, and the like.

In FIG. 1, a timeslot teleconferencing server (TTS) 90 is operatively connected to the network 30. The timeslot teleconferencing server 90 includes the normal hardware and software of a server as understood by one skilled in the art. The teleconferencing server 90 is a component operative to interact with an email (and calendar) server 80 allowing hosts to create timeslot teleconferences for the teleconference server 90. The email server 80 is configured to include the normal software and hardware for an email and calendar server as understood by one skilled in the art. The email server 80 and the timeslot teleconference server 90 may include also include communication interface 40, display 45, user interfaces 50, processors 60, and memory 25 although not shown for conciseness.

The user of the communication device 20 is designated as the host and the user of communication devices 21-24 are designated as participants (such as invitees) for explanation purposes. The application 102 of the communication device 20 is operative to interact with a server application 104 of the email server 80. For example, the application 102 may communicate with the server application 104 in a client/server relationship. The server application 104 is configured to allow the host to set up a teleconference using, e.g., the conference bridge 70. The conference bridge 70 may include and represent conference servers and/or circuits for bridging voice communications (and video) for the users of communication devices 20-24. As understood by one skilled in the art, the conference bridge 70 is a specialized type of device that may include one or more circuit boards and software to bridge or connect multiple circuits, channels, telephone lines, Internet protocol (IP) networks, etc., in order to effect a conference call. The conference bridge 70 is configured to connect communication device across various platforms including soft phones, voice over Internet Protocol (VoIP) phones, mobile phones, wireline telephones, etc. Also, the conference bridge 70 can be hosted over the regular telephone network, such as the public switched telephone network (PSTN) and plain old telephone system (POTS).

The teleconference server 90 may include a user profile manager 110 and database 110. The teleconferencing application 106 is configured to interact with the user profile manager 110. The user profile manager 110 is a component operative to store a user profile 112 for each participant including the host in the database 110. For each participant (e.g., of the communication devices 20-24), prior to the teleconference call, the user profile manager 110 is utilized to configure the user profile 112 with an email identification (ID) such as an email address, a list of contact numbers (reach numbers) for the participants, and user preferences. Each participant has a user profile 112 with one or more reach numbers. The participant can specify daytime, evening, and/or mobile numbers, and can specify dialing order of the reach numbers, a retry counter, and/or a preference for all numbers to ring simultaneously. For example, when Chuck on communication device 21 receives an invite from the host Alice, Chuck can click on a link in the invite that connects to the user profile manager 110 and Chuck can make changes to his user profile 112 as discussed herein.

The server application 104 of the email server 80 is operative to interact with the timeslot teleconference server 90 to create, update, and/or delete timeslot teleconference meetings. In accordance with exemplary embodiments, it is understood by one skilled in the art that existing corporate infrastructure will be enhanced to support these feature.

Figure 2:
FIG. 2 illustrates an example of a view in accordance with exemplary embodiments.

The application 102 (e.g., including the features of an email client) is operative to support new tabs analogous to the "Appointment" and "Scheduling" tabs, called the "Groups" and "Timeslots" tabs (as shown in FIGS. 2 and 3). Utilizing the application 102, when the host on the communication device 20 creates a meeting invite, she will use these tabs to specify the groups and timeslot attendance for each participant of the communication devices 21-24. Based on the meeting invite and/or the reach numbers in the user profile 112, the teleconferencing application 106 calls each participant at the time for his or her respective timeslot (such as timeslot 1) and causes the conference bridge 70 to bridge the call so that the called participants can actively participate in the current session of the timeslot teleconference.

The participants utilizing the communication devices 21-24 may login to the teleconferencing application 106 and/or may download features a tool 106a-e of the teleconferencing application 106. Logging into the teleconferencing application 106 and/or downloading software components to interact with the teleconferencing application 106 is represented as tools 106a-e in a dashed box of the communication devices 20-24. The tool 106a of the communication device 20 allows the host Alice to manage the timeslot teleconference by interacting with the teleconferencing application 106. The tools 106b-e allow the participants on the communication devices 21-24 to follow the timeslot teleconference call on the conference bridge 70 and to receive advance notice of their timeslot from the teleconferencing application 106. For example, the teleconferencing application 106 may cause a message to display on the tools 106b-e, such as, e.g., "Your timeslot will begin in five minutes". Also, the tools 106a-e allows the participants to see all the other attendees of the conference call via the teleconferencing application 106. The features of tools 106a-e and/or the teleconferencing application 106 of exemplary embodiments can be can be integrated with a collaboration tool such as AT&T CONNECT®, MICROSOFT® Live Meeting, and/or instant messaging applications. The tool 106a is a multifaceted application with command and control functions of the timeslot teleconference including administrative rights, ability to add and drop users, advance timeslots, etc. The tools 106b-106e are user applications with limited privileges for example that may provide notifications, participant lists, progress of the timeslot teleconference, and/or meeting materials, but are not limited to these functions.

In accordance with exemplary embodiments, the application 102 of the host may include an email client such as OUTLOOK®, and the application 102 may include an add-in to OUTLOOK® or other email clients that will enable the host to create groups, add people to groups, define a series of timeslots such as slot 1, slot 2, slot 3, etc., add users or groups to the timeslots, and/or then send out a meeting invite to all participants on the communication devices 21-24. Although illustrated as two separate software components, the software components of the application 102 and the server application 104 may reside in the email server 80 as the server application 104, and the host user on the communication device 20 can access the server application 104 over the network 30.

FIG. 2 illustrates an example of a view 200 of the application 102 in accordance with exemplary embodiments. FIG. 3 illustrates an example of a view 230 of the application 102 in accordance with exemplary embodiments. The views 200 and 230 are graphical user interfaces (GUI) of the application 102 in which the host can interact with using the user interface 50, such as a mouse and keyboard.

The view 200 of the application 102 illustrates creating participant groups for a teleconference call in accordance with exemplary embodiments. The view 230 of the application 102 illustrates assigning groups and/or individual participants to timeslots in accordance with exemplary embodiments.

The view 200 and 230 of the application 102 provides various tabs for creating the timeslot teleconference. For explanation purposes, the host of the teleconference is on the communication device 20 and her name is Alice. In the view 200 and the view 230, the host can utilize an appointment tab 202, a scheduling tab 204, a groups tab 206, and a timeslots tab 208. The appointment and scheduling tabs 202 and 204 may be standard components of calendar applications as understood by one skilled in the art.

Using the application 102, Alice creates the meeting agenda and timeline via the scheduling tab 204. The meeting agenda and timeline of the application 102 determine the start time and end time of the teleconference meeting, the number (e.g., 4) and order of timeslots (such as the first, second third, etc.), and the length of each timeslot. For example, each timeslot may be 30 minutes and there may be 4 different timeslots. Also, the timeslots do not have to be equal length, and some may be 15, 30, 45, and/or 60 minutes, or more.

Alice creates a meeting request utilizing the application 102 (e.g., in OUTLOOK®), and the meeting request may be created (using, e.g., a calendar application within the application 102) in a similar fashion as understood by one skilled in the art. Using the view 200 of the application 102, Alice sets up groups using the groups tab 206 and timeslots using the timeslot tab 206 in view 200.

The view 200 illustrates that the groups tab 206 has been selected by Alice. For example, utilizing the application 102, Alice may create groups, such as group 1, group 2, and group 3 and may add participants to groups 1, 2, and 3 as shown in the view 200. In view 200 of the application 102, group 1 includes Alice, Bob, and Chuck; group 2 includes Alice, Chuck, and Edgar; and group 3 includes Bob, Chuck and Denise. Also, it is noted that Alice may add participants to the invite list who are not in any group. When the host utilizes the application 102 to place designated participants in a particular group, any action specified for the group affects each participant in the group.

Now turning to FIG. 3, the view 230 illustrates assigning groups and/or individual participants to one or more timeslots utilizing the application 102 in accordance with exemplary embodiments. Continuing with the example, utilizing the application 102, Alice can assign participants to timeslots and assign groups to timeslots as shown in the view 230. In view 230, Alice has created slot 1, slot 2, slot 3, and slot 4 utilizing application 102. In view 230, the Y in parenthesis (Y) illustrates that a participant is included in a timeslot because of the group the participant is designated in. In slot 1, there are no groups designated. However, in slot 1, participants are designated, such as Alice, Bob, Chuck, and Edgar. In slot 2, group 2 and group 3 are designed by Alice the host. By Alice designating group 2 and group 3 for slot 2 in the view 230, the application 102 is operative to automatically designate the corresponding participants (for groups 2 and 3) with a (Y) in slot 2, which are Alice, Bob, Chuck, Denise, and Edgar. As seen in view 230, no groups are designated in slot 3 but individual participants Bob and Chuck are designated in slot 3. Now, in slot 4, Alice has designated group 2 and the application 102 automatically designates the corresponding participants (with (Y)) who are Alice, Chuck, and Edgar.

In the agenda of a meeting invite, each timeslot may be initially assigned a set start time (such as 2:00) and end time (such as 3:00), and each slot may have a specific initial length of time (e.g., 60 minutes). These start and end times are not fixed and the actual start and end times will be determined during the teleconference call by the host (via the tool 106a); the host triggers an advance (via the tool 106a) to the next timeslot as needed by the ebb and flow of the conversation and/or the progress through the agenda. The teleconference can end before all timeslots are visited by the host and participants. For example, the host (utilizing the application 102) may send a meeting invite with timeslots 1, 2, 3, and 4 for respective groups and individual participants, and each timeslot may be associated with an initial start and end time. However, during the timeslot teleconference, the host (via the tool 106a) does not have to follow the initial start and end times of the timeslots 1, 2, 3, and 4; during the timeslot teleconference, the tool 106a is configured to allow any of the timeslots 1, 2, 3, and 4 to run longer than the specified initial length of time, to start at the discretion of the host, to end at the discretion of the host, to be skipped, to occur out of order, and/or to not occur at all, all of which is based on the direction of the host.

Now turning back to the example, when Alice has completed the groups, participants, and timeslots for the teleconference utilizing the application 102, Alice utilizes the application 102 to send the invite to the teleconference server 90 via the email server 80, and Alice can update the invite if needed. The server application 104 of the email server 80 receives the invite from the application 102, and the email server 80 sends the invite to the teleconferencing application 106 of the timeslot teleconference server 90 to create a timeslot teleconference based on the invite. The teleconferencing application 106 of the timeslot teleconference server 90 server updates the bridge information on the invite by, e.g., obtaining the conference bridge telephone number and pass codes for the conference bridge 70.

Also, if not previously stored, Alice can utilize the application 102 to cause the user profile manager 110 to store the user profile 112 for each participant (e.g., Chuck, Denise, Bob, and Edgar) of timeslot teleconference, and the user profiles 112 are configured prior to the teleconference call. Each participant in the teleconference will have a corresponding email identification (ID) such as an email address, a list of contact numbers for reaching the participant for the call, and user preferences.

Further regarding the user profiles 112 for the participants, each participant has a user profile 112 with one or more reach numbers, and the participants can specify daytime, evening, and/or mobile numbers, an order in which numbers should be dialed, a retry counter, and a preference for all contact numbers to ring simultaneously. If the participants of the communication devices 21-24 work for a corporation and/or have utilized the timeslot teleconference services of the timeslot teleconference servers 90 before, the participants may already have information in their respective user profiles 112.

Additionally, Alice the host may also create email groups where Alice can combine existing participants under a single label or use "Global Email Address List" group names to invite groups defined within, e.g., a corporate email service. For the global email address list, all group members must have their user profiles 112 in the database 110 for this functionality.

When the teleconference server 90 receives the invite from the email server 80 sent by the host on the communication device 20, the teleconferencing application 106 adds to the invite the conference bridge number (along with the pass codes) to call into for the timeslot teleconference and/or the teleconferencing application 106 may transmit the conference bridge number back to the host Alice along with the pass code and host code. For example, the server application 104 of the email (calendar) server 80 is operative to interact with the teleconference application 106 of the timeslot teleconference server 90 to set up the teleconference call and to update all the meeting invites with the conference bridge information.

Once the host Alice receives the invite having the conference bridge information (such as the conference bridge call in number, participant pass codes which may be different per timeslot such as slot 1, slot 2, slot 3, and slot 4, and the host code) from the teleconference application 106, Alice utilizes the application 102 to send the invite to each respective participant of communication devices 21-24 via the email server 80. The participants of the communication devices 21-24 receiving invites from Alice on communication device 20 (via the email server 80) will receive and see an agenda, the timeslots they are respectively invited to, and a conference bridge number along with one or more numbers that the teleconference server 90 recognizes as their respective reach number. Each participant can use the invite (e.g., click a link or login with a pass code) to access the user profile manager 110. The participant (on communication devices 21-24) can modify his reach numbers and any of his preferences in the user profile 112 in preparation for the teleconference.

Participants on the communication devices 21-24 may directly call into the conference bridge 70 if permitted by the host Alice and user their respective timeslot pass code. Otherwise, all participants will be added by "Dial-outs" where the timeslot teleconference server 90 will originate the calls to the participants in accordance with their assigned timeslot and causes the conference bridge 70 to bridge the individual calls into a single call to be where each participant can talk and be heard by all participants. Additionally, some participants may call into the conference bridge 70, and teleconference server 90 may call other the participants.

Figure 4:
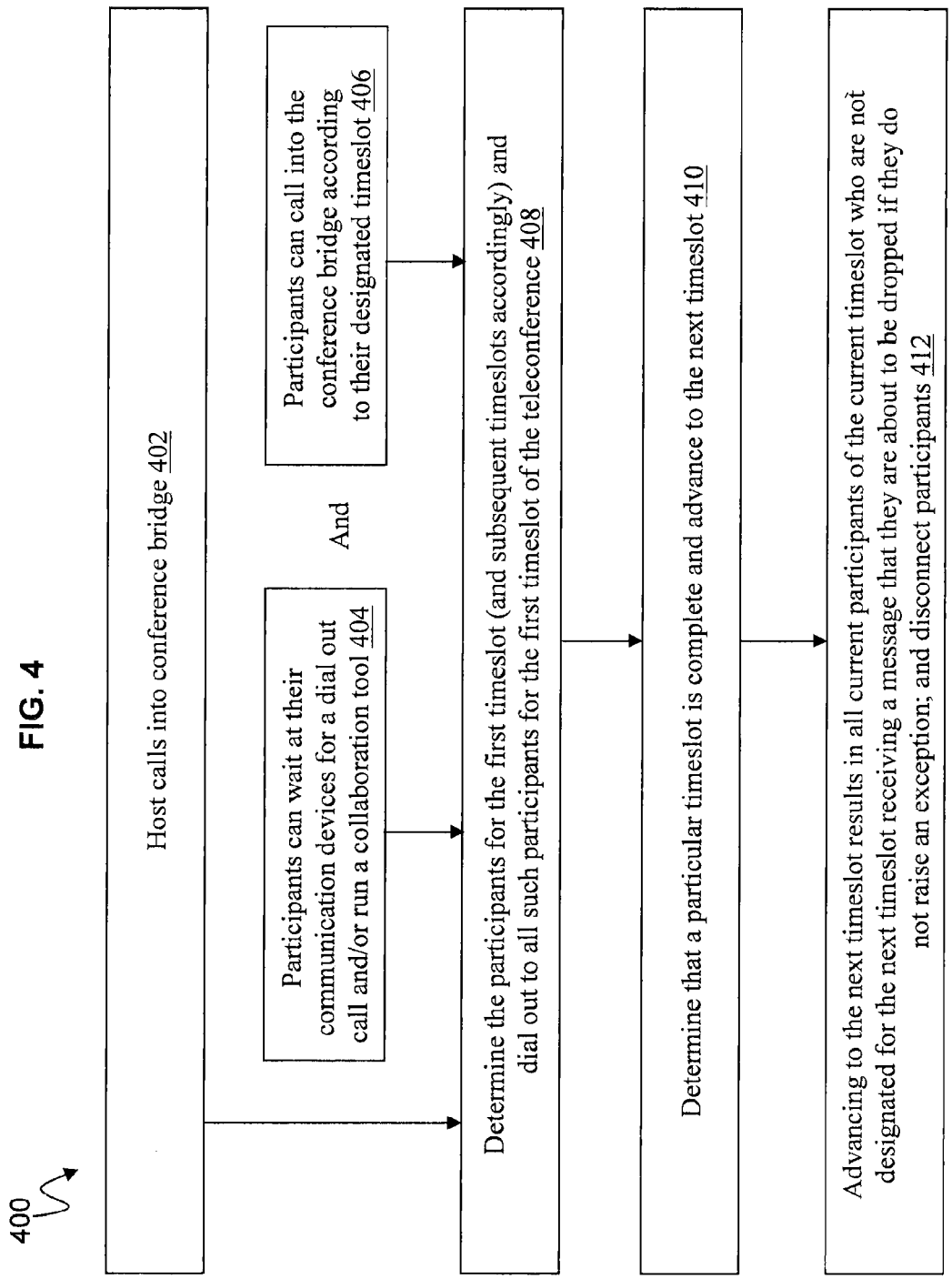

Now turning to FIGS. 4 and 5, FIGS. 4 and 5 illustrate a process flow 400 for a timeslot teleconference call in accordance with exemplary embodiments.

When Alice the host on the communication device 20 starts the teleconference call on the conference bridge 70, she will call into a special conference bridge 70 with the host code at operation 402. The host may call into the conference bridge 70 in the manner as understood by one skilled in the art. The host will have access to the call management tool 106a (that includes a timeslot teleconference call dashboard/console) which interacts with the teleconferencing application 106 of the teleconference server 90. The management tool 106a is shown as dashed lines because it may be downloaded to the communication device 20 and/or the management tool 106a may be logged into and run on the teleconference server 90. Also, the management tool 106a along with the tools 106b-e may operate as a thin client, thick client, and/or hybrid client with the teleconferencing application 106 as understood by one skilled in the art. For example, the tools 106a-e may be run through a browser (such as Internet Explorer®) with and/or without downloading client (type) applications to run on the communication devices 20-24.

The participants (Chuck, Denise, Bob, and Edgar) can wait at their telephone such as the communication devices 21-24, and/or run a collaboration tool (106b, 106c, 106d, and 106e) such as AT&T® Connect or MICROSOFT® Live Meeting which will interact with the teleconferencing application 106 of the timeslot teleconference server 90 at operation 404.

Participants can call into the conference bridge 70 at their designated timeslot but will not be required to do so at operation 406. Instead, the teleconferencing application 106 of the timeslot teleconference server 90 can determine the participants for the first timeslot 1 (and subsequent timeslots accordingly) and will actively call out (dial out) to all such participants for the timeslot 1 of the teleconference at operation 408. The teleconferencing application 106 will automatically dial out to the subsequent timeslot 2, when instructed by the host on the management tool 106a and/or at a set time indicated for timeslot 2, and so forth.

As mentioned herein, the teleconferencing application 106 of the timeslot teleconference server 90 can be integrated with the collaboration tools 106a-e (such as AT&T CONNECT®, MICROSOFT® Live Meeting, and/or instant messaging platforms), and utilizing the collaboration tools 106b-e, participants can join the meeting via a participant console and/or a web site and track the progress of the teleconference call on the conference bridge 70. By tracking the progress of the teleconference call via the collaboration tools 106*b-e*, the participant in timeslot 4 can visually see on the display 45 as timeslots 1, 2, and 3 end and when timeslot 4 begins. The host utilizing the management tool 106*a* may and/or the teleconferencing application 106 can automatically alert participants via the tool 106*b-e* with a message "Your timeslot will begin in 5 minutes" and indicate to the participants that "you are about to get a call to join the teleconference bridge", which allows the participants some time before their telephone (communication devices 21-24) rings. The participants can also see the attendee list and interact with the host and other users by utilizing the collaboration tool 106*b-e*. Additionally and/or alternatively, the timeslot teleconference server 90 can send an instant message (IM) to the communication devices 21-24 of the participants before their communication device 21-24 rings to alert them of the forthcoming call with the message "Your timeslot will begin in 5 minutes".

As the teleconference call progresses (e.g., through the meeting agenda) of the teleconference and the host determines that a particular timeslot (e.g., the timeslot 1) is complete, Alice the host will utilize the management tool 106*a* to "advance to the next timeslot", e.g., by selecting timeslot 2 with the user interface 50 at operation 410. This will result in all current participants of timeslot 1 who are no longer needed receiving a system message from the teleconferencing application 106 that they are about to be dropped and if they do not raise an exception by inputting (or dialing) a special code and/or making a special statement, and the teleconference application 106 will disconnect those participants who did not raise an exception at operation 412. If the participants who are about to be dropped do wish to continue, they may hit a special code to stay on the conference bridge 70 and the host will be notified via the management console 106*a* if any participant inputs the special code to remain on the teleconference call. The host can make a selection on the management tool 106*a* by the participant's name (which can include a group such as group 2 and by extension all corresponding individual participants in that group 2) to cause the timeslot teleconference not to drop the participant from the teleconference bridge 70.

If the participant is connected via the collaboration tool 106*b-d*, the participant can be notified and dropped by the teleconferencing application 106, or participant can be notified and put on hold if need be in case the participant is required for a future timeslot (e.g., such as timeslot 2 after timeslot 1 has ended) by the teleconferencing application 106. In accordance with exemplary embodiments, the teleconferencing application 106 allows participants to (only) see shared documentation during their own timeslots via their respective collaboration tool 106*b-e*. Alice the host can use the management console tool 106*a* to control the interactions between the timeslot teleconference server 90 and the collaboration tools 106*b-e* to control sharing of desktops, documents, and/or displays for the teleconference.

After a previous timeslot has ended, when a current timeslot is about to end (e.g., 5 minutes before the ending time), and/or at the direction of the host via the management tool 106*a*, the teleconferencing application 106 of the timeslot teleconference server 90 is operative to call all the participants on the next timeslot (who are not already connected to the teleconference bridge 70 from a previous timeslot) at operation 414. When the participants pick up their handsets of the communication devices 21-24 (or press a button to accept the call), the teleconferencing application 106 is operative to automatically add the participants to a holding bridge of the conference bridge 70 called the lobby.

In case a participant (e.g., at communication device 21) does not pick up (e.g., answer the ringing communication device 21), the teleconferencing application 106 is configured to execute a predefined number (which may be in the user profile 112) of re-tries before timing out and to inform the host of the same via the management tool 106*a*. The teleconferencing application 106 will send the unreachable participant (e.g., at communication device 21) a meeting reminder via email and the missing participant can join the bridge directly (by calling into the conference bridge 70) if the participant's timeslot has started.

After the last timeslot (e.g., timeslot 4 in FIG. 3), the teleconferencing application 106 of the teleconference server 90 notifies all participants on the communication devices 21-24 (by voice and/or a display message) that the "last timeslot has ended", and the teleconferencing application 106 of the teleconference server 90 ends the teleconference call on the conference bridge 70 when the host on the communication device 20 disconnects at operation 416.

Further regarding calling participants, the teleconferencing application 106 of the teleconference server 90 is operative to call participants in the order of their reach phone number preferences in their respective user profile 112 or to call all numbers simultaneously, and the answered call by the participants (on their communication devices 21-24) is connected to the lobby on the teleconference server 90. The host controls the lobby via the management tool 106*a*. Utilizing the management tool 106*a*, the host can direct the teleconferencing application 106 to move the participants in the lobby to the teleconference bridge 70, e.g., at the start of timeslot 2, and/or the teleconferencing application 106 can automatically move the participants from the lobby to the teleconference bridge 70 at operation 418. For example, the teleconferencing application 106 can automatically move the participants from the lobby to the conference bridge 70 when a predefined number of participants have been connected (i.e., either answered the dial out call from the teleconferencing application 106 and/or have called into the conference bridge 70), at a set time in the meeting agenda, and/or when all participants have been connected. For each subsequent timeslot, the host can direct and/or teleconferencing application 106 can automatically move the participants from the lobby to the conference bridge 70 for the teleconference.

The teleconferencing application 106 will control who joins each timeslot and will require the host to approve any exceptions via the management tool 106 on the communication device 20. For example, by pressing, e.g., 2, on the host's communication device 20, the host can approve a participant on the communication device 21 who wants to join during a timeslot that the participant is not assigned to. Participants on the communication devices 21-24 cannot join the conference bridge 70 before their respective timeslot begins unless the host (utilizing the management tool 106*a*) approves the exception.

With regard to the lobby, once the host sees on a GUI of the management tool 106*a* that all required participants are on the call for a particular timeslot, the host can use the management tool 106 to interact with the teleconferencing application 106 to cause participants (on hold) to proceed from the lobby to the teleconference bridge 70 and start the next timeslot. The host can also bypass the lobby and have all participants join the teleconference bridge 70 directly.

By using the management console of the management tool 106*a*, the host is able to dynamically add individuals and/or groups on demand. Once added via the management tool 106*a* by the host Alice, the teleconferencing application 106 will dial out to those participants as though they were initially on the invite and/or as though the participants were initially designated for the current timeslot.

The teleconferencing application 106 of the teleconference server 90 is configured to use multiple phone numbers for a single participant, either simultaneously call all the reach numbers and connect the first one that picks up, and/or call reach numbers in a predefined order; however, this function of the teleconferencing application 106 can be overridden by the participant. The order of the reach numbers can be reconfigured dynamically by the participant (via the collaboration tool 106a-d) when the participant accepts the call and/or when the participant is first invited on the bridge by the invite all of which allows the participant some degree of flexibility if the participant has to rejoin the conference bridge 70 on a different reach number before the timeslot has started, during the timeslot, and/or after the timeslot has ended and a subsequent timeslot in which the participant is designated is about to start. Additionally, the communication device 21-24 of a participant drops inadvertently, by accessing (e.g., logging into and/or following a link in the invite) the user profile manager 110, the participant can configure his user profile 112 so that the teleconferencing application 106 of the teleconference server 90 calls the participant back if the participant is assigned to the current timeslot and/or the teleconferencing application 106 of the teleconference server 90 can be configured to determine (assume) that the person is no longer required.

By utilizing the management tool, 106a, the teleconferencing server 90 is configured to also allow the host to selectively mute and/or cut audio to participants by ID (such as the name of the participant and/or email address) and/or by group (such as group 1, group 2, group 3, etc.) in case the host wants to conduct a sidebar with a subset of the participants (such as with Denise and Bob respectively on communication devices 22 and 23) on the teleconference call. This will not require any participants to drop and rejoin.

After the last timeslot (e.g., timeslot 4 in FIG. 3), the teleconferencing application 106 of the teleconference server 90 notifies all participants on the communication devices 21-24 (by voice and/or a display message) that the "last timeslot has ended", and the teleconferencing application 106 of the teleconference server 90 ends the teleconference call on the conference bridge 70 when the host on the communication device 20 disconnects at operation 418.

The example flow 400 illustrated in FIGS. 4 and 5 is for explanation purposes only and is not meant to be limiting.

Exemplary embodiments are able to reduce customer costs and improve efficiency by effectively making customers use conferencing minutes more effectively and reduce the overall cost of the conference call in terms of total minutes of usage. Exemplary embodiments allow customers to no longer be tethered to long conference calls until they are needed, thus reducing the time wasted when waiting on a call. Accordingly, features of exemplary embodiments provide flexibility and productivity enhancement. Exemplary embodiments are configured to simplify calendar management by replacing several separate independent calls where participants have no knowledge of the others participants or overall agenda of the calls, with a single integrated timeslot teleconference. In teleconferencing, the whole is greater than the sum of the parts. The timeslot teleconference as disclosed in exemplary embodiments is more powerful than a series of separate disjoint calls. For example, the timeslot teleconference can simplify an escalation call to troubleshoot a network incident that is customer impacting. In this example a critical outage could require constant monitoring by network operations, customer care, field technicians, supervisors, VP level management, or the customers themselves. Separate calls can complicate management. Alternatively, in another example, exemplary embodiments can streamline a project lock-up review for a day that involves deep dives into various domains of a specific project and that requires the involvement of different subject matter experts to discuss various aspects of the project with the customer and the funder, such as project management, systems architecture, performance and scalability, usability, and design, development, and testing. In each of these cases, the timeslot teleconference provides unique capabilities unavailable to the participants from separate disjoint calls.

It is understood by one skilled in the art that each element such as the devices, servers, software, application, cards, modules, systems, interfaces, adapters, networks, controllers, computers, infrastructure, etc., described in the present disclosure contains all the necessary hardware, software, and/or firmware to operate and function as discussed herein in accordance with exemplary embodiments.

Figure 6:
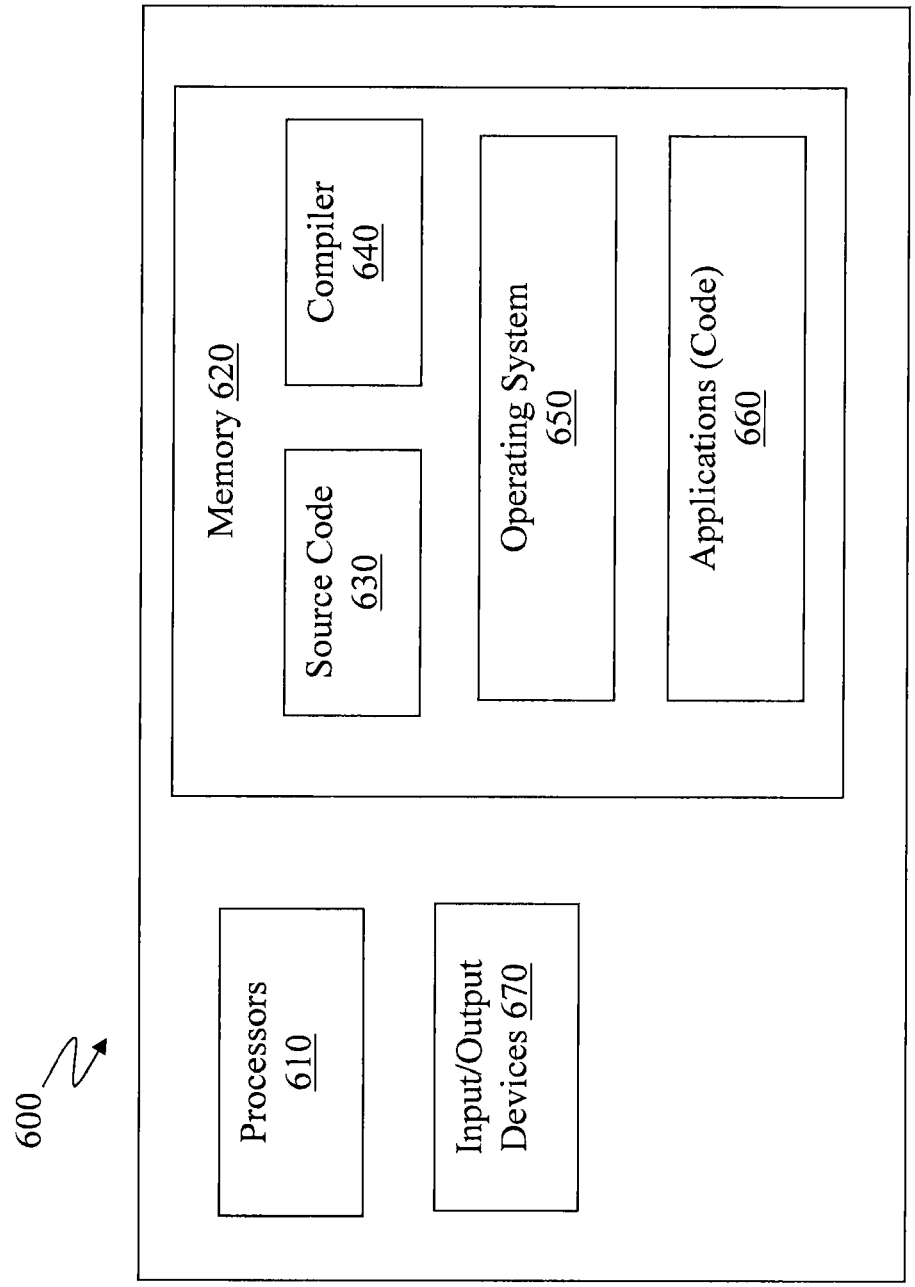
FIG. 6 illustrates an example of a computer that may be utilized in implementing exemplary embodiments.

FIG. 6 illustrates an example of a computer 600 that may be utilized in implementing exemplary embodiments. For example, the computer 600 may have one or more elements that may be utilized in implementing the communication devices 20-24, the email server 80, teleconference server 90, and/or conference bridge 70. The computer 600 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 600 may include one or more processors 610, memory 620, and one or more input and/or output (I/O) 670 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in computer readable storage memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable storage memory 620 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 620 may incorporate electronic, magnetic, optical, and/or other types of storage media. Note that the computer readable storage memory 620 can have a distributed architecture, where various components are situated remote from one another, but can be accessed by the processor 610.

The software in the computer readable storage memory 620 may include one or more separate programs, each of which comprises an ordered listing of executable instructions for implementing logical functions. In the example illustrated in FIG. 6, the software in the computer readable storage memory 620 includes a suitable operating system (O/S) 650, compiler 640, source code 630, and one or more applications 660 (or modules) of the exemplary embodiments.

The operating system 650 controls the execution of other computer programs, and provides scheduling, input-output control, file and data management, memory management, and communication control and related services. It is contemplated by the inventors that the application 660 for implementing exemplary embodiments is applicable on all other commercially available operating systems.

The application 660 may be a source program, executable program (object code), script, or any other entity comprising a set of instructions to be performed. When a source program is to be executed, then the program is usually translated via a compiler (such as the compiler 640), assembler, interpreter, or the like, which may or may not be included within the computer readable storage memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, remote controller, camera, biometric input device(s), a vibrator device for non-audible alert, etc. Furthermore, the I/O devices 670 may also include output devices, for example but not limited to, a printer, display, speaker, etc. Also, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 include may include modems, gateways, receivers, transmitters, transceivers, etc. for communicating over a communications network.

When the computer 600 is in operation, the processor 610 is configured to execute software stored within the computer readable storage memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software, it should be noted that the application 660 can be stored on virtually any computer readable storage memory for use by or in connection with any computer related system or method. In the context of this document, a computer readable storage memory may be an electronic, magnetic, optical, or other physical device or means that can contain or store a computer program for use by or in connection with a computer related system or method.

The application 660 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable storage medium can be stored, communicated, propagated, or transported for use by or in connection with the instruction execution system, apparatus, or device.

More specific examples (a nonexhaustive list) of the computer-readable storage medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
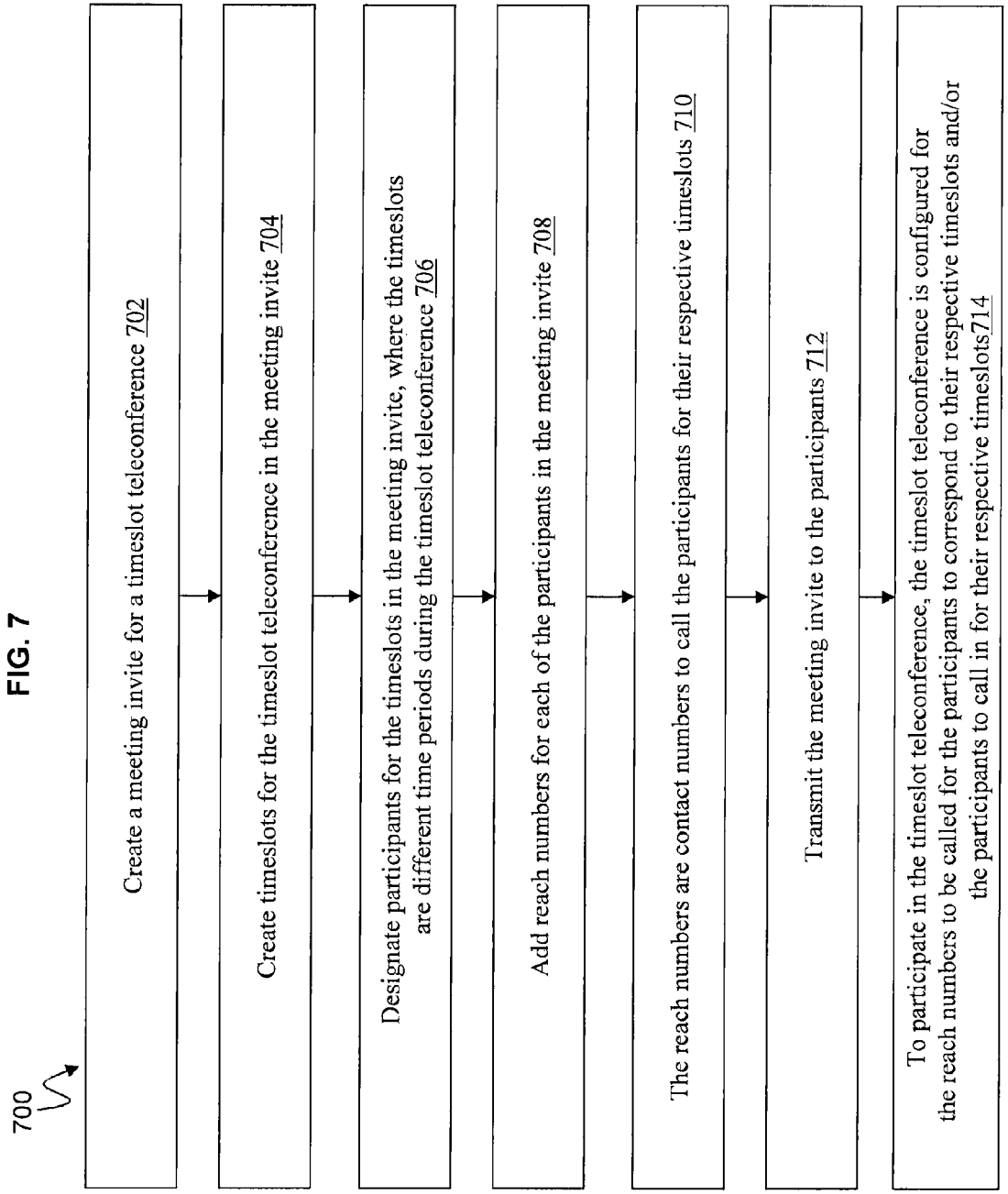
FIG. 7 illustrates a method for a timeslot teleconference in accordance with exemplary embodiments.

FIG. 7 illustrates a method 700 for a timeslot teleconference in accordance with exemplary embodiments.

The host on the communication device 20 creates a meeting invite for a timeslot teleconference at operation 702.

The host on the communication device 20 creates timeslots for the timeslot teleconference in the meeting invite at operation 704.

The host on the communication device 20 designates participants for the timeslots in the meeting invite, and the timeslots are different time periods during the timeslot teleconference at operation 704.

The host on the communication device 20 adds reach numbers for each of the participants in the meeting invite at operation 706. For example, the host may send the meeting invite to the teleconference server 90 to obtain the reach numbers for each participant in their respective user profile 112. Also, via the teleconferencing application 106, the host on the communication device 20 may interact with the user profile manager 110 to obtain and add the reach number from the user profile 112.

The reach numbers are contact numbers to call the participants for their respective timeslots at operation 708. The reach numbers are stored in respective user profiles 112 with additional preferences and rules for notification of the participants.

The host on the communication device 20 transmits the meeting invite including the respective reach numbers to the participants at operation 710.

To participate in the timeslot teleconference, the timeslot teleconference server 90 is configured by the host on the communication device 20 for at least one of the reach numbers to be called for the participants to correspond to their respective timeslots and the participants to call in for their respective timeslots at operation 712.

Further in exemplary embodiments, the host on the communication device 20 configures the teleconference server 90 not to call the participants when their respective timeslots are not in session. When the participants call in and their respective timeslots are not in session, the host on the communication device 20 configures the timeslot teleconference server

90 to prevent the participants from being connected to the timeslot teleconference until their respective timeslots are in session (i.e., about to start and/or have started). The timeslot teleconference server 90 is configured to disconnect the participants when their respective timeslots have ended on the timeslot teleconference and connect the participants of a next timeslot to the timeslot teleconference. The host on the communication device 20 configures the timeslots of the timeslot teleconference so that only participants designated to a particular timeslot of the timeslots can participate in the teleconference when the particular timeslot is started and/or about to start. The timeslots are configured by the host on the communication device 20 to restrict particular participants from participating in the timeslot teleconference during a particular timeslot when those particular participants are not designated to the particular timeslot. During the timeslot teleconference for a particular timeslot, the host on the communication device 20 configures the timeslot teleconference server 90 to stop any participants who are not previously designated for the particular timeslot from being able to engage in the timeslot teleconference. The timeslot teleconference is a single conference comprising a plurality of timeslots.

When the participants are called for an upcoming timeslot, the host on the communication device 20 configures the timeslot teleconference server 90 to place the participants for the upcoming timeslot in a lobby after the participants for the upcoming timeslot have answered the call and the lobby is a holding arrangement for the participants to wait for the upcoming timeslot. The participants for the upcoming timeslot are moved (bridged) to the timeslot teleconference when at least one of a previous timeslot has completed, the host initiates the start of the upcoming timeslot, a set time for the upcoming timeslot is reached, and/or a predefined number participants for the upcoming timeslot are in the lobby.

Figure 8:
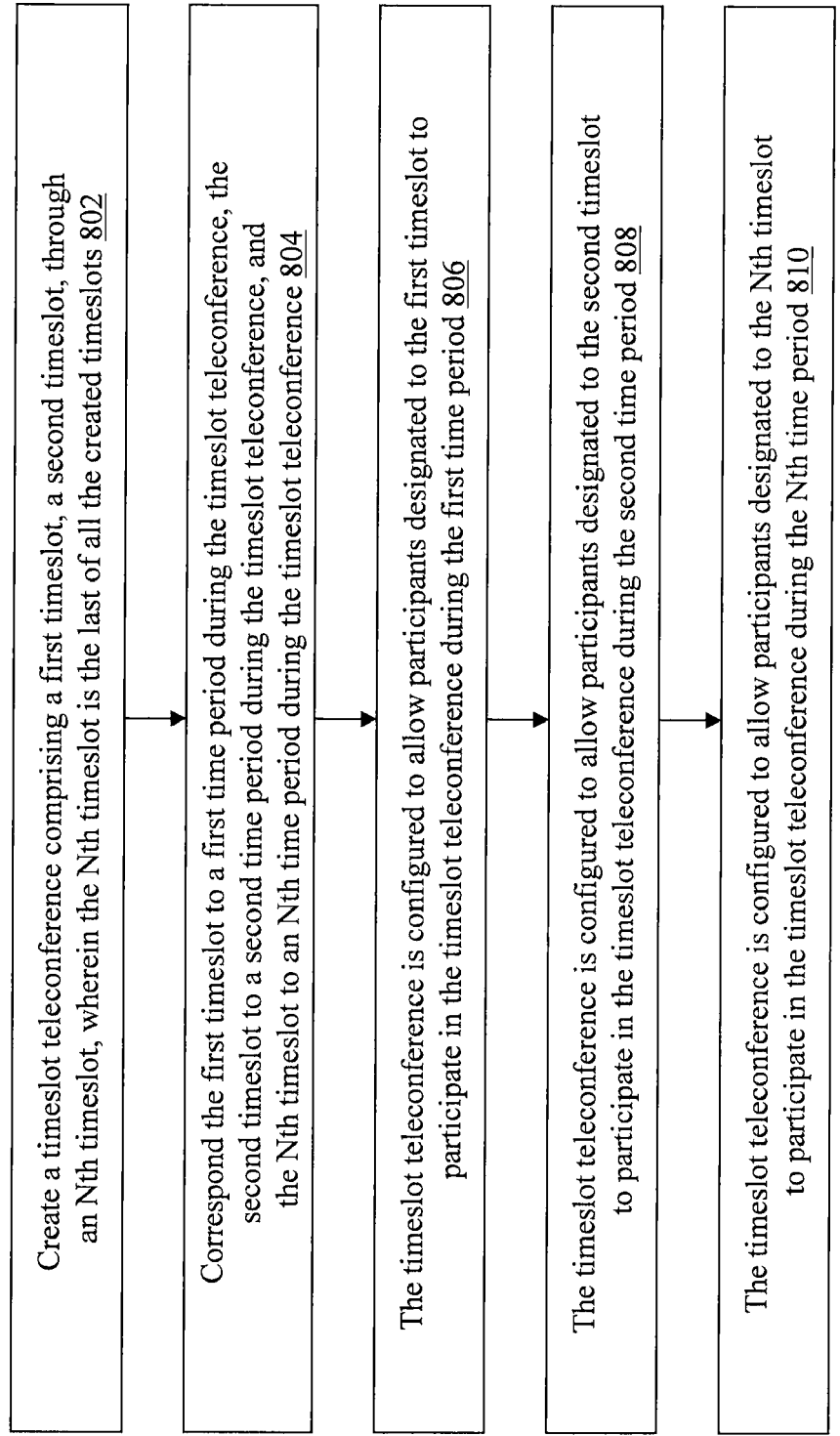
FIG. 8 illustrates a method for a timeslot teleconference in accordance with exemplary embodiments.

FIG. 8 illustrates a method for a timeslot teleconference in accordance with exemplary embodiments.

The host on the communication device 20 creates a timeslot teleconference comprising a first timeslot, a second timeslot, through an Nth timeslot, and the Nth timeslot is the last of all the created timeslots at operation 802.

The host on the communication device 20 corresponds the first timeslot to a first time period during the timeslot teleconference, the second timeslot to a second time period during the timeslot teleconference, and the Nth timeslot to an Nth time period during the timeslot teleconference at operation 804.

The timeslot teleconference is configured by the host on the communication device 20 to allow participants designated to the first timeslot to participate in the timeslot teleconference during the first time period at operation 806.

The timeslot teleconference is configured by the host on the communication device 20 to allow participants designated to the second timeslot to participate in the timeslot teleconference during the second time period at operation 808.

The timeslot teleconference is configured by the host on the communication device 20 to allow participants designated to the Nth timeslot to participate in the timeslot teleconference during the Nth time period at operation 810.

Further in exemplary embodiments, the host on the communication device 20 configures the timeslot teleconference server 90 to restrict participants from participating in any timeslot in which the participants are not designated. When the first time period of the timeslot teleconference occurs, the timeslot teleconference server 90 is configured by the host on the communication device 20 to call the participants designated to the first timeslot. When the second time period of the timeslot teleconference occurs, the timeslot teleconference server 90 is configured by the host on the communication device 20 to call the participants designated to the second timeslot. When the Nth time period of the timeslot teleconference occurs, the timeslot teleconference server 90 is configured by the host on the communication device 20 to call the participants designated to the Nth timeslot.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer such as the computer 1900, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method implemented on a computer for a timeslot teleconference, the method comprising:
  creating on the computer a meeting invite for the timeslot teleconference;
  creating on the computer timeslots for the timeslot teleconference in the meeting invite;
  designating on the computer participants for the timeslots in the meeting invite, wherein the timeslots are different time periods during the timeslot teleconference that can have variable start and end times, as determined by a host;
  adding on the computer reach numbers for each of the participants in the meeting invite;
  wherein the reach numbers are contact numbers to call the participants for respective timeslots; and
  transmitting on the computer the meeting invite to the participants;
  wherein to participate in the timeslot teleconference, the timeslot teleconference is operative for a selection of the reach numbers to be called for the participants to correspond to the respective timeslots and the participants to call in for the respective timeslots;

wherein when the participants are called for an upcoming timeslot, operating the timeslot teleconference to place the participants for an upcoming timeslot in a lobby after the participants for the upcoming timeslot have answered the call;

wherein the lobby is a holding arrangement for the participants to wait for the upcoming timeslot; and moving the participants for the upcoming timeslot to the timeslot teleconference when a selection of:

a previous timeslot has completed;

the host initiates start of the upcoming timeslot;

a set time for the upcoming timeslot is reached; and a predefined number participants for the upcoming timeslot are in the lobby.

2. The method of claim 1, further comprising not calling the participants when the respective timeslots are not in session.

3. The method of claim 1, further comprising when the participants call in and the respective timeslots are not in session, preventing the participants from being connected to the timeslot teleconference until the respective timeslots are in session.

4. The method of claim 1, further comprising disconnecting the participants when the respective timeslots have ended on the timeslot teleconference; and connecting the participants of a next timeslot to the timeslot teleconference.

5. The method of claim 1, further comprising designating groups for the timeslots, wherein the groups comprise various participants.

6. The method of claim 1, further comprising operating the timeslots of the timeslot teleconference so that only participants designated to a particular timeslot of the timeslots can participate in the teleconference when the particular timeslot is started.

7. The method of claim 1, wherein the timeslots are operative to restrict particular participants from participating in the timeslot teleconference during a particular timeslot when the particular participants are not designated to the particular timeslot.

8. The method of claim 1, further comprising during the timeslot teleconference for a particular timeslot, operating the timeslot teleconference to stop any participants who are not previously designated for the particular timeslot from being able to engage in the timeslot teleconference.

9. The method of claim 1, wherein the timeslot teleconference is a single teleconference comprising a plurality of timeslots; and wherein the reach numbers are stored in a user profile with additional preferences and rules for notification.

10. A device, comprising:

memory comprising computer-executable instructions;

a processor executing the computer-executable instructions, the computer-executable instructions, when executed by the processor, cause the processor to perform operations comprising:

creating a meeting invite for a timeslot teleconference;

creating timeslots for the timeslot teleconference in the meeting invite;

designating participants for the timeslots in the meeting invite, wherein the timeslots are different time periods during the timeslot teleconference;

adding reach numbers for each of the participants in the meeting invite;

wherein the reach numbers are contact numbers to call the participants for the respective timeslots; and transmitting the meeting invite to the participants;

wherein to participate in the timeslot teleconference, the timeslot teleconference is operative for a selection of the reach numbers to be called for the participants to correspond to the respective timeslots and the participants to call in for the respective timeslots;

wherein when the participants are called for an upcoming timeslot, operating the timeslot teleconference to place the participants for an upcoming timeslot in a lobby after the participants for the upcoming timeslot have answered the call;

wherein the lobby is a holding arrangement for the participants to wait for the upcoming timeslot; and moving the participants for the upcoming timeslot to the timeslot teleconference when a selection of:

a previous timeslot has completed;

the host initiates start of the upcoming timeslot;

a set time for the upcoming timeslot is reached; and a predefined number participants for the upcoming timeslot are in the lobby.

11. The device of claim 10, further comprising not calling the participants when the respective timeslots are not in session.

12. The device of claim 10, further comprising when the participants call in and the respective timeslots are not in session, preventing the participants from being connected to the timeslot teleconference until the respective timeslots are in session.

13. The device of claim 10, further comprising disconnecting the participants when the respective timeslots have ended on the timeslot teleconference; and connecting the participants of a next timeslot to the timeslot teleconference.

14. The device of claim 10, further comprising designating groups for the timeslots, wherein the groups comprise various participants.

* * * * *